Patented Oct. 17, 1950

2,526,556

UNITED STATES PATENT OFFICE 2,526,556

PREPARATION OF N-ETHYL AND N,N-DIMETHYL BETA-ALANINE

Thomas L. Gresham and Forrest W. Shaver, Akron, Ohio, assignors to The B. F. Goodrich Company, New York, N. Y., a corporation of New York No Drawing. Application November 19, 1948, Serial No. 61,125

11 Claims. (Cl. 260—534)

1

This invention relates to an improved method for the preparation of N-ethyl and N,N-dimethyl beta-alanine and pertains particularly to the preparation of such compounds by the reaction of ethyl or dimethyl amine with beta-propiolactone.

The reaction of beta-propiolactone with primary alkyl monoamines and dialkyl amines ordinarily proceeds in such a manner as to yield principally an N-substituted hydracrylamide together with a small proportion of an N-alkyl-beta-alanine.

We have discovered, however, that when two specific amines are used, namely ethyl amine and dimethyl amine, the amine being added to beta-lactone, and when the reaction is carried out in a completely organic liquid medium, the reaction proceeds in such a manner as to give high yields of the N-substituted beta-alanine, with only a small proportion of amide being formed. The two reactions contemplated above proceed substantially as follows; the lactone ring cleaving between the beta carbon atom and the ring oxygen:

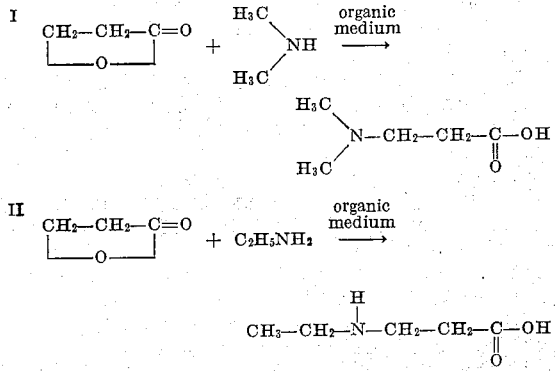

In carrying out the reaction of beta-propiolactone with dimethyl amine and with ethyl amine, which amines are further characterized by possessing two carbon atoms, seven hydrogen atoms and one nitrogen atom, that is, having the formula C₂H₇N, it is necessary that the amine be added to the beta-lactone and that the reaction mixture be completely organic, that is, that it be free from water and inorganic materials, for the addition of the beta-lactone to the amine and the presence of water and other inorganic materials favor the formation of the amide rather than the amino acid. However, no other special conditions are necessary for the success of the reaction. For instance, the reaction may

2 be carried out simply by adding the amine in gaseous form to the beta-lactone, whereupon reaction occurs to form principally an N-substituted beta-alanine. More desirably, however, the reaction is conducted by first dissolving the beta-propriolactone in an organic solvent and then adding the C₂H₇N amine. The use of such solvent permits easy stirring of the reaction mixture as well as decreasing the tendency of the beta-lactone to polymerize to give polyester acids. The specific nature and amount of the solvent used, if any, are not at all critical since any polar or non-polar organic solvent may be used so long as it is capable of existing in the liquid state, and is substantially inert to the reactants, under the conditions used. It is desirable that the solvent be volatile, preferably that it have a boiling point below 150° C. since it can then be more readily recovered and reused in the process. Specific inert solvents which are effective include benzene, toluene, pentanes, hexanes, and other liquid saturated aliphatic or aromatic hydrocarbons; chlorinated liquid derivatives of such hydrocarbons as chlorobenzene and ethylene dichloride; liquid ethers such as diethyl ether, dipropyl ether, etc.; liquid esters such as methyl acetate, ethyl acetate, methyl propionate and the like; liquid organic nitriles such as acetonitrile, propionitrile, benzonitrile, etc.; and liquid ketones such as acetone, methyl ethyl ketone, etc. Liquid alcohols are also substantially inert to the reactants under the preferred conditions of the reaction (that is, at temperatures of —30° to 60° C. and, since the reaction is effected in a completely organic medium, in the absence of inorganic acids and bases), despite the fact that alcohols do react with beta-lactones under other conditions. Accordingly, such alcohols may be employed as solvents if desired, examples of suitable alcohol solvents being methanol, ethanol, ethylene cyanohydrin, ethylene chlorohydrin and especially tertiary alcohols such as tertiary butanol and the like. It is to be understood that liquid mixtures of the above compounds may be used as the solvent even though one or more of the components of the mixture is a solid under the operating conditions in the pure state. Solvents of this nature will dissolve the beta-lactone (beta-lactones of the kind used in this invention are generally soluble in polar organic solvents) but do not dissolve N-ethyl and N,N-dimethyl substituted beta-amino carboxylic acids (which are soluble in water but insoluble or very sparingly soluble in organic solvents) and hence in addition to providing a convenient medium for the reaction, afford a convenient means of separating and recovering the desired reaction product.

The quantities of beta-propiolactone and amine employed in the reaction are likewise not critical and may be varied widely. For example, the reactants may be brought together in equimolecular quantities (the amount stoichiometrically required for the reaction) or an excess of either reactant may be utilized, and in fact highest yields of the desired N-substituted beta-alanine are obtained with the preferred solvents when an excess of the amine is employed.

The reaction is preferably carried out at atmospheric pressure and at temperatures within the range of −50° C. or lower and as high as 60° C. or even higher. A preferred temperature range is from 0° C. to 50° C. However, other temperatures and pressures may be used provided the solution of beta-propiolactone is maintained in the liquid condition during the reaction.

As disclosed hereinabove, a preferred method of effecting the reaction of the invention comprises adding dimethyl amine or ethyl amine, preferably in the gaseous form, to a completely organic solution containing beta-propiolactone maintained at the desired reaction temperature whereupon the N-substituted beta-alanine precipitates from the solution. The product is readily recovered from the reaction medium, for example, by filtering or other usual means, and is purified, preferably by dissolving in water and recrystallizing from alcohol solution. Both N,N-dimethyl beta-alanine and N-ethyl beta-alanine can be obtained in very pure form in this manner. As an alternative method of carrying out the reaction, the amine and the beta-propiolactone may be gradually proportioned into the solvent whereupon reaction occurs to form the N-substituted beta-alanine, although the yields are not as good as those obtained by the preferred procedure.

The following specific examples, wherein all parts are by weight, are intended to illustrate the practice of this invention, but it is to be understood that the invention is not limited thereto, for there are, of course, numerous variations and modifications.

EXAMPLE I

Gaseous dimethyl amine is bubbled into a stirred solution of 72 parts (1 mole) of beta-propiolactone in 214 parts of diethyl ether contained in a reaction vessel equipped with stirrer, temperature control means and temperature measuring means. The temperature of the reaction mixture is maintained at −5° C. to 0° C. until no more of the amine is absorbed, that is, until an excess of the amine has been utilized. The reaction mixture is then warmed to room temperature and the solid which has formed during the addition of the amine to the lactone is filtered off and dried. Upon recrystallization of the solid material 98 parts (84%) of N,N-dimethyl beta-alanine, (M. P. 142°–143° C.) are obtained.

EXAMPLE II

An excess of gaseous dimethyl amine is bubbled into 144 parts (2 moles) of beta-propiolactone over a period of 40 minutes, the temperature being maintained at from 15° to 20° C. throughout the addition of the amine, during which time a solid precipitates, making the reaction mixture very difficult to stir. The reaction mixture is allowed to stand for two hours after which the solid material is dissolved in hot water and the undissolved material (probably beta-lactone polymer) is filtered off. The filtrate is concentrated and the product precipitates. Upon recrystallization of the product from methanol, a 65% yield of N,N-dimethyl beta-alanine (M. P. 142°–143° C.) is obtained.

EXAMPLE III

Ethylamine in the gaseous form is bubbled into a stirred solution of 72 parts (1 mole) of beta-propiolactone in 234 parts of acetonitrile while maintaining the temperature of the reaction mixture at approximately 20° C. As the amine is added the product precipitates from the solution as a white solid. After no more of the amine is absorbed, the solid is filtered from the reaction mixture and dried. The dried material is then recrystallized from methanol and diethyl ether. An 84% yield of N-ethyl beta-alanine is obtained.

*Analysis*

| Calculated for $C_5H_{11}HO^2$ | Found |
|---|---|
| Per Cent Carbon, 51.28 | Per Cent Carbon, 51.40. |
| Per Cent Hydrogen, 9.40 | Per Cent Hydrogen, 9.44. |
| Per Cent Nitrogen, 11.96 | Per Cent Nitrogen, 11.83. |

When the above examples are repeated using other of the organic solvents listed hereinabove, for example, methyl alcohol, ethyl acetate, acetone and the like, an N-substituted beta-analine is again obtained in substantial yield. Similar results are also obtained by temperatures other than those disclosed in the specific examples.

The reaction of beta-propiolactone with the $C_2H_7N$ amines, that is, dimethyl amine and ethyl amine, in accordance with this invention provides a simple method of economically obtaining N,N-dimethyl beta-alanine and N-ethyl beta-alanine, which are very useful organic compounds. For example, they are of physiological importance, being useful as medicinal ingredients. They are also useful as intermediates in the preparation of other organic compounds and for many other uses.

Numerous modifications and variations of the invention will be obvious to those skilled in the art and are included within the spirit and scope of the appended claims.

We claim:

1. The method which comprises adding an aliphatic amine of the formula $C_2H_7N$ to a completely organic liquid containing beta-propiolactone, whereupon reaction occurs between the amine and the beta-lactone to form an N-substituted beta-alanine, and separating said N-substituted beta-alanine from the reaction mixture.

2. The method which comprises adding an aliphatic amine of the formula $C_2H_7N$ to a completely organic liquid containing beta-propiolactone while maintaining the temperature in the range of from −50° C. to 60° C., whereupon chemical reaction occurs between the amine and the beta-lactone to form an N-substituted beta-alanine, and separating said N-substituted beta-alanine from the reaction mixture.

3. The method which comprises adding an aliphatic amine of the formula $C_2H_7N$ to a completely organic liquid containing beta-propiolactone, while maintaining the temperature in the range of from 0° to 50° C., whereupon chemical reaction occurs between the amine and the beta-lactone to form an N-substituted beta-alanine, and separating said N-substituted beta-alanine from the reaction mixture.

4. The method which comprises adding dimethyl amine to a completely organic liquid containing beta-propiolactone, while maintaining the temperature in the range of from −50° C. to 60° C., whereupon chemical reaction occurs between the amine and the beta-lactone to form N,N-dimethyl beta-alanine, and separating said N,N-dimethyl beta-alanine from the reaction mixture.

5. The method which comprises adding ethyl amine to a completely organic liquid containing beta-propiolactone, while maintaining the temperature in the range of from −50° C. to 60° C., whereupon chemical reaction occurs between the amine and the beta-lactone to form N-ethyl beta-alanine, and separating said N-ethyl beta-alanine from the reaction mixture.

6. The method which comprises adding an excess of gaseous dimethyl amine to a solution of beta-propiolactone in diethyl ether while maintaining the temperature in the range of from 0° C. to 50° C., whereupon chemical reaction occurs to form N,N-dimethyl beta-alanine, and separating said N,N-dimethyl beta-alanine from the reaction mixture.

7. The method which comprises adding an excess of gaseous ethyl amine to a solution of beta-propiolactone in acetonitrile while maintaining the temperature in the range of from 0° C. to 50° C., whereupon chemical reaction occurs to form N-ethyl beta-alanine, and separating said N-ethyl beta-alanine from the reaction mixture.

8. The method which comprises adding an aliphatic amine of the formula $C_2H_7N$ to a solution of beta-propiolactone in a liquid solvent selected from the class consisting of hydrocarbons, chlorinated hydrocarbons, ethers, esters, nitriles, ketones and alcohols, whereupon chemical reaction occurs between the amine and the beta-lactone to form an N-substituted beta-alanine, and separating said N-substituted beta-alanine from the reaction mixture.

9. The method which comprises adding an aliphatic amine of the formula $C_2H_7N$ to a solution of beta-propiolactone in a liquid solvent selected from the class consisting of hydrocarbons, chlorinated hydrocarbons, ethers, esters, nitriles, ketones and alcohols, while maintaining the temperature in the range of from 0° C. to 50° C., whereupon chemical reaction occurs between the amine and the beta-lactone to form an N-substituted beta-alanine, and separating said N-substituted beta-alanine from the reaction mixture.

10. The method which comprises preparing a reaction mixture consisting of an aliphatic amine of the formula $C_2H_7N$ and beta-propiolactone by adding said amine to said beta-lactone, whereupon chemical reaction occurs to form an N-substituted beta-alanine, and separating said N-substituted beta-alanine from the reaction mixture.

11. The method which comprises preparing a reaction mixture consisting of an aliphatic amine of the formula $C_2H_7N$ and beta-propiolactone by adding said amine to said beta-lactone, while maintaining the temperature in the range of 0° C. to 50° C., whereupon chemical reaction occurs to form an N-substituted beta-alanine, and separating said N-substituted beta-alanine from the resulting reaction mixture.

THOMAS L. GRESHAM.
FORREST W. SHAVER.

REFERENCES CITED

The following references are of record in the file of this patent:

UNITED STATES PATENTS

| Number | Name | Date |
|---|---|---|
| 2,372,654 | Bergel et al. | Apr. 3, 1945 |
| 2,375,005 | Kung | May 1, 1945 |
| 2,377,814 | Schnider | June 5, 1945 |
| 2,442,143 | Pickel et al. | May 25, 1948 |
| 2,446,615 | Shive | Aug. 10, 1948 |

OTHER REFERENCES

Basler, Ber. Deut. Chem., vol. 17, pages 1502–1503 (1884).

Johansson, Chem. Zentr., vol. 1916 II, pages 557–558.